United States Patent
Balakrishnan et al.

(10) Patent No.: US 9,148,274 B2
(45) Date of Patent: Sep. 29, 2015

(54) SYSTEM AND METHOD TO DETECT AND COMMUNICATE LOSS AND RETENTION OF SYNCHRONIZATION IN A REAL-TIME DATA TRANSFER SCHEME

(75) Inventors: Bipin Balakrishnan, Eindhoven (NL); Andrei Radulescu, Eindhoven (NL)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 226 days.

(21) Appl. No.: 13/879,137

(22) PCT Filed: Oct. 18, 2011

(86) PCT No.: PCT/EP2011/068204
§ 371 (c)(1),
(2), (4) Date: May 21, 2013

(87) PCT Pub. No.: WO2012/052450
PCT Pub. Date: Apr. 26, 2012

(65) Prior Publication Data
US 2014/0310566 A1      Oct. 16, 2014

Related U.S. Application Data

(60) Provisional application No. 61/394,070, filed on Oct. 18, 2010.

(51) Int. Cl.
| | |
|---|---|
| H04L 1/18 | (2006.01) |
| H04L 7/00 | (2006.01) |
| H04L 1/00 | (2006.01) |
| H04L 1/08 | (2006.01) |
| H04L 1/16 | (2006.01) |
| H04L 7/10 | (2006.01) |

(52) U.S. Cl.
CPC ............ *H04L 7/0029* (2013.01); *H04L 1/0083* (2013.01); *H04L 1/0091* (2013.01); *H04L 1/08* (2013.01); *H04L 1/1678* (2013.01); *H04L 7/0083* (2013.01); *H04L 7/10* (2013.01)

(58) Field of Classification Search
CPC ...................................................... H04L 1/1809
USPC .......................................................... 714/748
See application file for complete search history.

(56) References Cited

U.S. PATENT DOCUMENTS

| | | | |
|---|---|---|---|
| 5,039,980 A * | 8/1991 | Aggers et al. ................. | 340/506 |
| 5,444,709 A | 8/1995 | Riddle | |
| 6,718,425 B1 * | 4/2004 | Pajakowski et al. .......... | 710/315 |
| 2008/0165864 A1 | 7/2008 | Eleftheriadis et al. | |
| 2009/0086646 A1 | 4/2009 | Kuchibhotla et al. | |

FOREIGN PATENT DOCUMENTS

WO        95/09504 A2      4/1995

OTHER PUBLICATIONS

International Search Report issued in corresponding International application No. PCT/EP2011/068204, date of mailing Jan. 30, 2012.

* cited by examiner

*Primary Examiner* — Fritz Alphonse
(74) *Attorney, Agent, or Firm* — Patent Portfolio Builders PLLC

(57) ABSTRACT

Systems and methods for handling a loss of message boundary in a real-time data transmission over an interconnect between a source node and a destination node are described. The destination node receives messages including one or more data frames. Each data frame includes an end-of-message flag, which is set when the data frame is last frame of a message, and a message sequence number, which is different for different messages. The destination node determines a loss of message boundary when a new data frame has a message sequence number different from the message sequence number of a previously received message, which did not have the end-of-message flag set. The destination node then transmits a synchronization loss message to the source node, and receives, as response, a status report message. The destination node is able to regain synchronization by determining a lost message boundary according to the status report message.

28 Claims, 10 Drawing Sheets

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| SL | LAST Rx MSG SEQ # | | | | | | | OFFSET | | | | | | | |

SL = '0' IMPLIES STATUS QUERY MESSAGE
SL = '1' IMPLIES SYNC LOSS MESSAGE 36a, b

FIG. 5

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| UNUSED | PREVIOUS MSG SEQ # | | | OFFSET VALUE OF PREVIOUS MSG | | | | | | | | | | | |
| EoM | CURRENT MSG SEQ # | | | OFFSET VALUE OF CURRENT MSG | | | | | | | | | | | |

EoM FLAG = '0' IMPLIES THE CURRENT MSG IS ONGOING.
EoM FLAG = '1' IMPLIES THE CURRENT MSG HAS FINISHED AND DATA FRAMES THAT FOLLOW THIS STATUS MESSAGE WILL HAVE A NEW MESSAGE SEQUENCE #

SYSTEM AND METHOD TO DETECT AND COMMUNICATE LOSS AND RETENTION OF SYNCHRONIZATION IN A REAL-TIME DATA TRANSFER SCHEME

TECHNICAL FIELD

The present invention relates to real-time data transport over a point-to-point or a network-based interconnect, and specifically to a protocol to detect and notify data losses in, for example, an interconnect-based mobile device architecture.

BACKGROUND

The transport of data over error prone links could lead to corruption and/or occasional loss of data unless re-transmission of data received in error or data that is not received at all is carried out. Since for real-time data, such re-transmissions hinder the timely delivery of data, usually data with real-time requirements is delivered with errors and/or sometimes with gaps (data loss) to the real-time application. Most real-time applications can tolerate the gaps in data as long as it has not lost some synchronization points (such as message boundaries). Upon synchronization losses, real-time applications need a reliable mechanism to get back into synchronization. This mechanism should also work for a bi-directional data transport schemes that do not or cannot allow for re-transmissions of data. Moreover, the real-time applications can exchange variable sized messages made up of variable sized data frames or they could interleave fixed size messages with variable sized ones, which makes the detection of synchronization losses more challenging than the case where applications exchange fixed size messages or fixed size data frames or both.

In the Mobile Industry Processor Interface (MIPI) Alliance, several hardware interface standards are being developed so as to enable the seamless interfacing between processors and other application specific integrated circuits (ASICs) in a mobile platform. Unified Protocol (UniPro), which is one such hardware interface standard, enables data exchange at high speeds between different components on a mobile system over chip-to-chip networks built up of high speed serial links. It is a generic, strongly layered protocol based on ISO-OSI reference protocol stack that provides error handling (through re-transmissions based on Cyclic Redundancy Checks (CRC)), flow control, routing and Quality of Service (QOS) guarantees. Some of the applications supported by UniPro belong to the real-time category. Real-time applications generate data streams which require timely delivery. In other words, if the data is not delivered before a particular deadline, it is of no use. An example of such an application is raw video where data is uncompressed and bandwidth requirement is around 500 Mbps. For such applications, error handling through re-transmissions hinders timely delivery.

Hence it is better to deliver data with errors. Most of the time, the receivers can tolerate loss of data but losing synchronization information can be a problem. For example, there are generally two types of synchronization signals in video: horizontal sync, and vertical sync. In a very simplified manner, horizontal sync signals tell the processor when to move the video signal to the next lower line across the screen and the vertical sync signal tells the processor when to start again from the top of the screen. Loss of either or both of these signals could severely affect the quality of the displayed video.

Therefore, there is a need for a protocol to detect loss of synchronization information at the receiver and communicate it to the transmitter. An additional requirement for this protocol is that it should be simple (i.e., be easily integrated to existing or emerging data transport protocols such as UniPro) and also it should not rely upon any reliable mode of communication. Accordingly, it would be desirable to provide methods, modes and systems for detection and communication of synchronization loss and synchronization regain in a real time data transfer scheme that is easily integrated and is reliable.

SUMMARY

It is therefore a general aspect of the invention to provide a data communications protocol that will obviate or minimize problems of the type previously described. Exemplary embodiments address real-time data transport over a point-to-point or network-based interconnects and specifically to a protocol to detect and notify synchronization losses in such a data transfer scheme. A real-time data transmission requires timely delivery and therefore could have zero or fixed number of re-transmissions resulting in errors or gaps in data that is delivered. Such a real-time data transmission consists of transmitting a stream of data as multiple messages, which in turn is composed of smaller sized data frames. These data frames include an offset field, which indicates the number of data bytes transmitted so far from the particular real-time application, in each of the data frames transmitted from source to destination. Also each of the data frames carry a message sequence number to identify to which message it belongs to. The end of a message is explicitly signaled by an End-of-Message (EoM) flag in the last data frame of the message, and is implicitly understood from the change of message sequence number.

For applications that are sensitive to loss of message boundaries, the receiver is configured to send a synchronization loss indication when such an event is detected. In order to protect the synchronization loss indication and/or subsequent response, to get back in sync, from the transmitter from being lost, a first timer (Main Timer) is used at the receiver whose value is at least the sum of round trip delay and processing delay at the transmitter. If the response is not received before the timer expires, the synchronization loss indication is re-sent after re-starting the main timer. A second timer (Auxiliary (aux.) timer) at the receiver is used to protect the event that the data frame carrying the end of message flag gets lost and no further data frames arrive. Aux. timer is started at the beginning of a new message (e.g., message #1) and is restarted when a data frame belonging to that message is received. Aux. timer is stopped when the EoM flag is set for that message (i.e., the last data frame is received in regard to message #1). The expiry value of aux. timer is negotiated during the connection setup based on the application characteristics. In case aux timer expires, the receiver sends a status enquiry message to the transmitter to understand whether an error caused the absence of data. This status enquiry message is also protected by the first timer with round trip delay as its value.

According to a first aspect of the present invention, a method for handling a loss of message boundary in a real-time data transmission over an interconnect includes the steps of receiving over the interconnect and by a destination node a plurality of messages, wherein each message includes one or more data frames, and each data frame of each message includes an end-of-message flag and a message sequence number, and the end-of-message flag is set when the data frame is the last data frame in a particular message, and the message sequence number is different for different messages; and determining the loss of message boundary for one of a first message and a second message to be received over the interconnect by detecting that either: (a) at least one data frame belonging to the first message has been received, and a data frame belonging to the second message different from the first message has been received before a data frame having its end-of-message flag set and belonging to the first message has been received, or (b) a data frame belonging to a third message having a sequence number which is at least two greater than a sequence number associated with the first message has been received after the data frame having its end-of-message flag set and belonging to the first message has been received, and no data frame belonging to the second message having a sequence number higher than the sequence number of the first message and lower than the sequence number of the third message has been received.

According to a second aspect, an apparatus for handling a loss of message boundary in a real-time data transmission, includes a destination node transceiver configured to receive messages over an interconnect, wherein each message includes one or more data frames, and each data frame of each message includes an end-of-message flag and a message sequence number, the end-of-message flag set when the data frame is the last data frame in a particular message, and the message sequence number is different for different messages; and a destination node processor configured to determine the loss of message boundary for one of a first message and a second message to be received over the interconnect by detecting that either: (a) at least one data frame belonging to the first message has been received, and a data frame belonging to the second message different from the first message has been received before a data frame having its end-of-message flag set and belonging to the first message has been received, or (b) a data frame belonging to a third message having a sequence number which is at least two greater than a sequence number associated with the first message has been received after the data frame having its end-of-message flag set and belonging to the first message has been received, and no data frame belonging to the second message having a sequence number higher than the sequence number of the first message and lower than the sequence number of the third message has been received.

According to a third aspect, a non-transitory computer readable medium of instructions for correcting for a loss of message boundary in a real-time data transmission over an interconnect includes a first set of instructions adapted to receive, over the interconnect and at a destination node, one or more messages, wherein each message includes one or more data frames, and each data frame of each message includes an end-of-message flag and a message sequence number, the end-of-message flag set when the data frame is the last data frame in a particular message, and the message sequence number is different for different messages; and a second set of instructions adapted to determine the loss of message boundary for one of a first message and a second message to be received over the interconnect by detecting that either: (a) at least one data frame belonging to the first message has been received, and a data frame belonging to the second message different from the first message has been received before a data frame having its end-of-message flag set and belonging to the first message has been received, or (b) a data frame belonging to a third message having a sequence number which is at least two greater than a sequence number associated with the first message has been received after the data frame having its end-of-message flag set and belonging to the first message has been received, and no data frame belonging to the second message having a sequence number higher than the sequence number of the first message and lower than the sequence number of the third message has been received, a third set of instructions adapted to transmit by the destination node a synchronization loss message, a fourth set of instructions adapted to receive a status report message by the destination node in response to the synchronization loss message; and a fifth set of instructions adapted to synchronize received message data such that a previous message boundary can be determined according to the status report message.

BRIEF DESCRIPTION OF THE DRAWINGS

The above and other objects and features of the present general inventive concept will become apparent and more readily appreciated from the following description of the embodiments with reference to the following figures, wherein like reference numbers refer to like parts throughout the various figures unless otherwise specified, and wherein:

FIG. 1 is a high level block diagram depicting two devices that communicate via an interconnect and which can use loss of message boundary detection protocols according to exemplary embodiments to regain end of message boundaries and correct data transfer there between;

FIG. 5 depicts a Status Query/Sync Loss message sent by a source node to a destination node according to exemplary embodiments;

FIG. 6 depicts a status report message according to exemplary embodiments;

DETAILED DESCRIPTION

Figure 1:
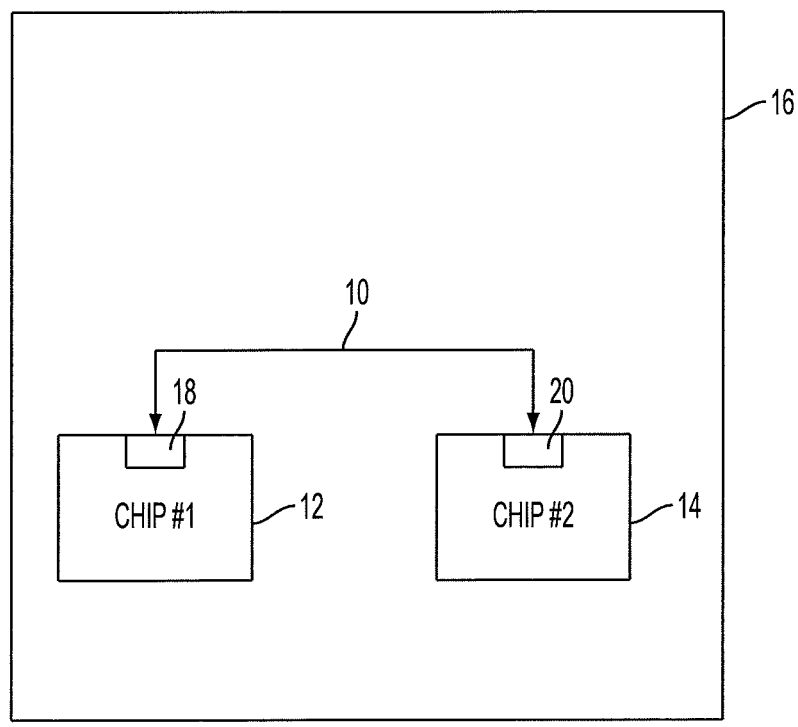

The inventive concept is described more fully hereinafter with reference to the accompanying drawings, in which embodiments of the inventive concept are shown. In the drawings, the size and relative sizes of layers and regions may be exaggerated for clarity. Like numbers refer to like elements throughout. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. Therefore, the scope of the invention is defined by the appended claims.

Exemplary embodiments of the general inventive concept utilize data frames, which belong to some data transport protocol, and which carry an offset field indicating the number of bytes that has been transmitted so far by the application and also the message sequence number of the message this data frame belongs to. There is a flag in the data frame that is set when that particular data frame carries the end data of the message. The combination of message sequence number and the end of message flag is used to identify the boundary of a particular message. These message boundaries in turn act as synchronization points for the receiver as each message corresponds to unit of data that should be processed as single entity. In the case a message boundary loss occurs, a sync loss notification is send to the transmitter (or source node) whose response is protected by a timer at the receiver (or destination node). The message boundary loss (or sync loss) is detected if an end data frame of a message is lost and a data frame belonging to a new message is received. In addition, any ongoing message transmission known at the receiver is protected from its boundary being lost through a second timer and hence is independent on the reception time of the subsequent message. Finally, the solution can be a part of a data exchange protocol in which improved reliability through re-transmissions is not possible.

In order to provide some context for discussion of the exemplary embodiments, some information is first provided about UniPro protocols and systems in which these exemplary embodiments can be used. However it will be understood by those skilled in the art that exemplary embodiments of the present invention include, but are not limited to, usage in UniPro standardized systems.

As generally shown in FIG. 1, a UniPro interconnect (or bus or interface) 10 can, for example, be used to connect groups, (e.g., pairs or other multiples up to 128) of devices (e.g., first chip 12 (i.e., an integrated circuit, or "chip")) and second chip 14) within composite device or system 16, such as a mobile phone used in a cellular phone system. The devices or first and second chips 12 and 14 can include various sorts of chips which transfer data over an interconnect, e.g., baseband chips, application processors, graphics chips, etc. Data packets that are conveyed over the interconnect or link 10 from, e.g., first chip 12 to second chip 14, can subsequently be routed to other destination chips or modules within the composite device 16 using a UniPro switch (not shown in FIG. 1). First and second chips 12 and 14 can, in this exemplary embodiment, each include a UniPro+M-PHY interface 18 and 20 (the interface 18, 20 can also be referred to as a "UniPort-M" interface 18, 20), and interconnect 10 can be implemented using a bidirectional dual simplex link, i.e., a link having one or more unidirectional PHY lanes in both directions. UniPort-M interfaces 18 and 20 allow up to four lanes per direction, with each lane in a single direction having the same power and speed capabilities; however, the two directions of the link can also have different capabilities. In this context, a "lane" can be considered to be a point-to-point, serial link operating in one transmit direction.

Among other things, UniPort-M interfaces 18 and 20 differ from existing interconnect interfaces with respect to, among other things, the flexibility that they permit in creating and configuring a link 10. For example, UniPort-M interfaces 18 and 20 support asymmetrical links, as opposed to other types of interfaces, such as PCI Express, RapidIO and HyperTransport, all of which require the two directions of the link to be fully symmetrical (i.e., both directions of the link have the same number of lanes). UniPort-M interfaces 18 and 20 can also allow only some of their lanes to be connected, and there are no restrictions on how the lanes are connected, since the lanes are renumbered during the link start-up as will be described below. In this context, the term "connected," as it refers to lanes, means physically connected. For example, suppose that first chip 12 is a chip that offers a UniPort-M interface 18 with four lanes, but is used in system 16 in which second chip 14 is attached to first chip 12 that has more limited connectivity, e.g., having only two receive lanes. As a result, two of the lanes available for first chip 12 are intentionally left physically unconnected. Lanes may also be accidentally unconnected due to physical errors between chips (e.g., circuit runs "open up" in the circuit board or flex foil). UniPort-M interfaces 18 and 20 also support asymmetrically configured links (e.g., the two directions of the links can be set in different power modes), as opposed to other interfaces, such as, for example, PCI Express, RapidIO and HyperTransport, all of which require the two directions of the link to be in the same power mode.

The protocol for detecting and communicating loss of message boundaries according to exemplary embodiments can belong, for example, to layer-4 (transport layer) of ISO-OSI reference protocol stack and would fit into data transport protocols such as UniPro. The transport layer provides interface to applications, which are the clients of the data transfer protocol, with end-to-end data and control information exchange along with necessary service (QOS) guarantees.

Figure 2:
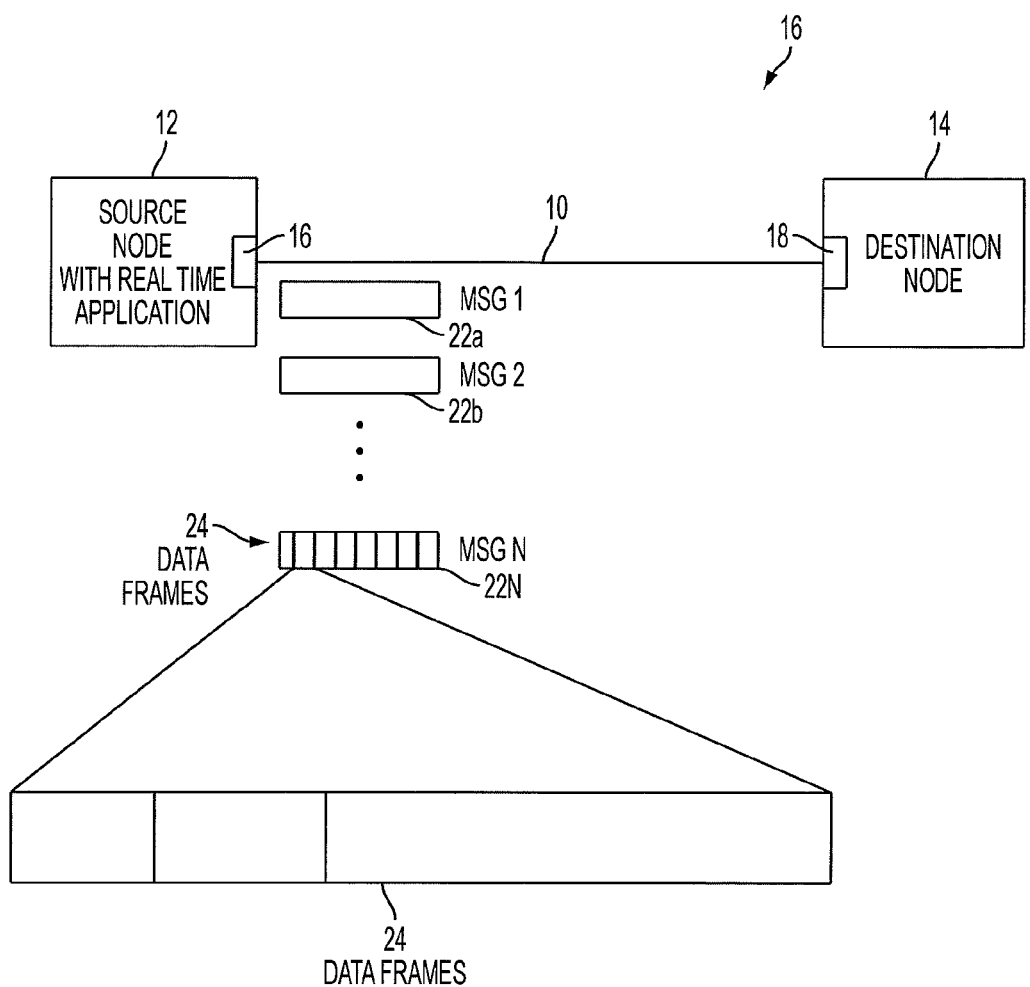
FIG. 2 is a block diagram of a transmitter-receiver (or source-destination node) pair within a device illustrating messages transmitted there-between and the composition of the messages to include data frames according to an exemplary embodiment.
Figure 3:
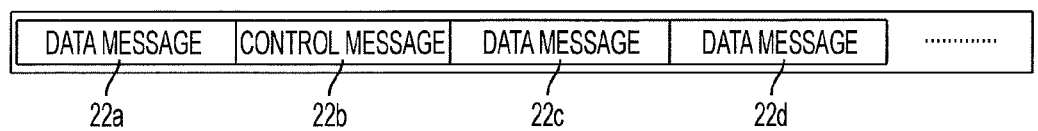
FIG. 3 illustrates an exemplary message transmission sequence from a real-time application.

FIG. 2 is a block diagram of a source-destination node pair 12, 14 within a device 16 illustrating message transmitted there-between and the composition of the messages to include data frames according to an exemplary embodiment. Messages 22 are protocol data units of the application layer and they usually contain application data that are processed as a single entity. Messages can be variable sized or fixed sized depending on the application, and according to exemplary embodiments of the general inventive concept, the size of the message is immaterial. The transport layer can provide a connection-oriented data transport mechanism or a connection-less data transport mechanism to the application. Exemplary embodiments work for both connection-oriented and connection-less transport mechanisms. Messages 22 are segmented into smaller sized units (data frames 24) and presented to the network layer at the transmitter transport layer, and at the receiver transport layer these smaller sized segments (data frames 24) are assembled back into a complete message. The packets, which are protocol data units of network layer (Layer-3), can be variable sized as well with a minimum and maximum bound on the sizes. According to exemplary embodiments, the size of the messages or packets (data frames 24) is not material. A first example of a real-time application (e.g., "tracing") can generate variable sized messages 22 composed of variable sized data frames 24, while a second example of a real-time application (such as raw video) can result in fixed size messages 22 and even fixed size data frames 24. FIG. 3 illustrates an exemplary message transmission sequence, which includes data and control messages, from a real-time application, such as a raw video.

According to further exemplary embodiments, data frames 24, which comprise messages 22, can rely on reliable or non-reliable data transfer capabilities of the Data Link layer (DLL or "Layer 2"). The reliable data transfer involving re-transmissions would hinder the tight bound on jitter required by the real-time data while that involving forward error correction seldom works for burst errors. Hence real-time data packets use the non-reliable data transfer capabilities of Layer 2 and exemplary embodiments of the general inventive concept are designed to work in an unreliable data transfer scheme.

Figure 4:
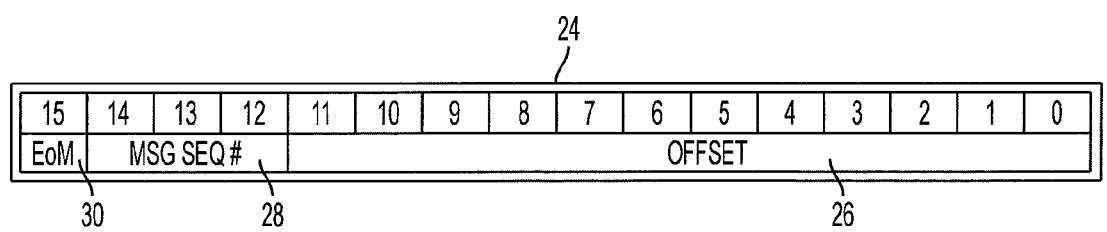
FIG. 4 illustrates fields of a data frame that can be included in a packet header of a message transmitted by a real time application according exemplary embodiments.

FIG. 4 illustrates fields that can be included in either a header or a trailer of data frame 24 transmitted by a real time data transmission protocol according exemplary embodiments. The fields shown in FIG. 4 can be easily incorporated into a transport layer header part (or trailer part) of any data transfer protocol packet with the trade-off of a slight increase in overhead. Offset field 26 is the absolute index that keeps track of the number of bytes transmitted from an application. The Layer-4 usually maintains a counter to keep track of amount data transmitted and this counter will wrap around when it reaches its terminal value and continue. Typically these counters will include 12 bits so that up to 4 KBs of data can be counted before the counter wraps around. According to an exemplary embodiment, the number of bits can be increased or decreased depending on the packet format of the data transfer protocol and also on the requirements of the applications that are the clients of the data transfer protocol. Hence the size of offset field 26 shown in FIG. 4 is only illustrative and not restrictive.

Message sequence number (msg. seq. #) field 28 uniquely identifies the message to which data frame 24 belongs to. The sequence number is incremented at each message boundary. According to an exemplary embodiment, the message sequence number can be 3 bits, so that up to 8 different messages can be identified. Generally, being able to differentiate between 8 messages is sufficient for most applications. As with the size of the offset field, the size of msg. seq. # field 28 is illustrative and not restrictive.

End of message (EoM) flag 30 is used to indicate the last data frame 24 in a message 22. According to an exemplary embodiment, EoM flag 30 is set (usually set to a logical value of "1") in the last data frame-24 in a message 22, and is reset (set to logical value "0") for all other data frames 24 in message 22.

In addition to the fields discussed in regard to FIG. 4, according to exemplary embodiments, there are two timers used in destination node 14. There is a possibility that a sync loss notification and/or its response could be corrupted by errors. First, or main timer 32, is used to protect this scenario. The expiry value of main timer 32 is set to at least the round trip delay of a data frame carrying the notification message and its response. According to further exemplary embodiments, it is also possible that data frames 24 of message 22 could be lost due to errors. If the transmission of data frames 24 of a first known message 22a was known at the receiver (through data frame 24 carrying message sequence number 28), then the message boundary of message 22a needs to be protected. According to an exemplary embodiment, a second or auxiliary (aux.) timer 34 protects the message boundary from becoming lost by helping to identify longer than normal gaps in data arrival, which could be due to a link error that causes data loss that can lead to gaps or temporary pauses in data transmission from the transmitter. The expiry value of aux. timer 34 is programmable and negotiated before the data transmission begins based on the data transmission characteristics (for example periodic, aperiodic etc.) of the application. According to an exemplary embodiment of the general inventive concept, main and aux. timers 32, 34 function mutually exclusively. That is, they never run at the same time. Therefore, in an implementation they can be combined into a single timer with different reset values. Main and Aux timers 32, 34 are shown as independent embodiments in the figures in order to improve clarity in presenting the inventive concept and hence are not restricted from being combined. A detailed discussion of the functioning of main and aux. timers 32, 34 is presented below with the assistance of the message sequence charts (FIGS. 7-10). However, prior to discussing the message sequence charts in FIGS. 7-10, messages 24 used by the exemplary protocol to communicate between the source and destination nodes 12, 14, are first presented in FIGS. 5 and 6.

FIG. 5 depicts a Status Query/Sync Loss message 36 sent by source node 12 to destination node 14 according to an exemplary embodiment. Message 36 shown in FIG. 5 is called sync loss message 36a when the "Sync Loss" (SL) flag is set, and when the sync loss flag is not set, then message 36 can be referred to as status query message 36b. The remaining fields in message 36 are the last received message sequence number 28 carried in the last correctly received data frame 24 and the corresponding offset value 26.

Whenever source node 12 receives a status query message 36a, or a sync loss message 36b from destination node 14, source node 12 responds with status report message 38, shown in FIG. 6. Status report message 38 carries the message sequence number of the previous message and its corresponding end offset in addition to the current message sequence number and its offset value. For the current message, an EoM flag 30 is added to distinguish if the data transmission for this message is ongoing or it has also ended. The offset values (i.e., the total number of bytes transmitted by the application) of the previous and current message are maintained at the transmitter (Data Source). According to an exemplary embodiment, it is possible to eliminate one of the message sequence numbers. If the value of previous message sequence number is known, then the current message sequence number at destination node 14 can be calculated very easily, and if the current message sequence number is known, then the previous message sequence number can be easily determined. All such alternative means of determining or knowing the message sequence numbers are within the exemplary embodiments of the general inventive concept. In FIG. 6 both the current and previous message sequence numbers are shown in order to explicitly convey the concept, but this is understood to not be restrictive in regard to the various exemplary embodiments. According to further exemplar embodiments, the number of bits used to represent the offset value and the message sequence number should be same as that used for a Layer-4 header as shown in FIG. 4. According to a further exemplary embodiment, the previous message sequence number field, in FIG. 6 set to three bits, can represent at least the immediate previous message sequence number, or a set of previous messages. For example, in the former case, if the current message number is 8, than the previous message number should be 7. The offset value of the current message will indicate the amount of data in the current message, and the offset value of the previous message will indicate the amount of data transmitted in message 7. However, if in the latter case, the previous message number indicated a set of the previously transmitted messages, for example, three, then the current message is 8, and the offset value of the current message will indicate the amount of data in the current message, but the offset value of the previous message will indicate the amount of data in messages 7, 6, and 5, the set of the last three messages. In this case, status report message 38 can show a contiguous amount of data transmitted, regardless of message boundaries.

Figure 7:
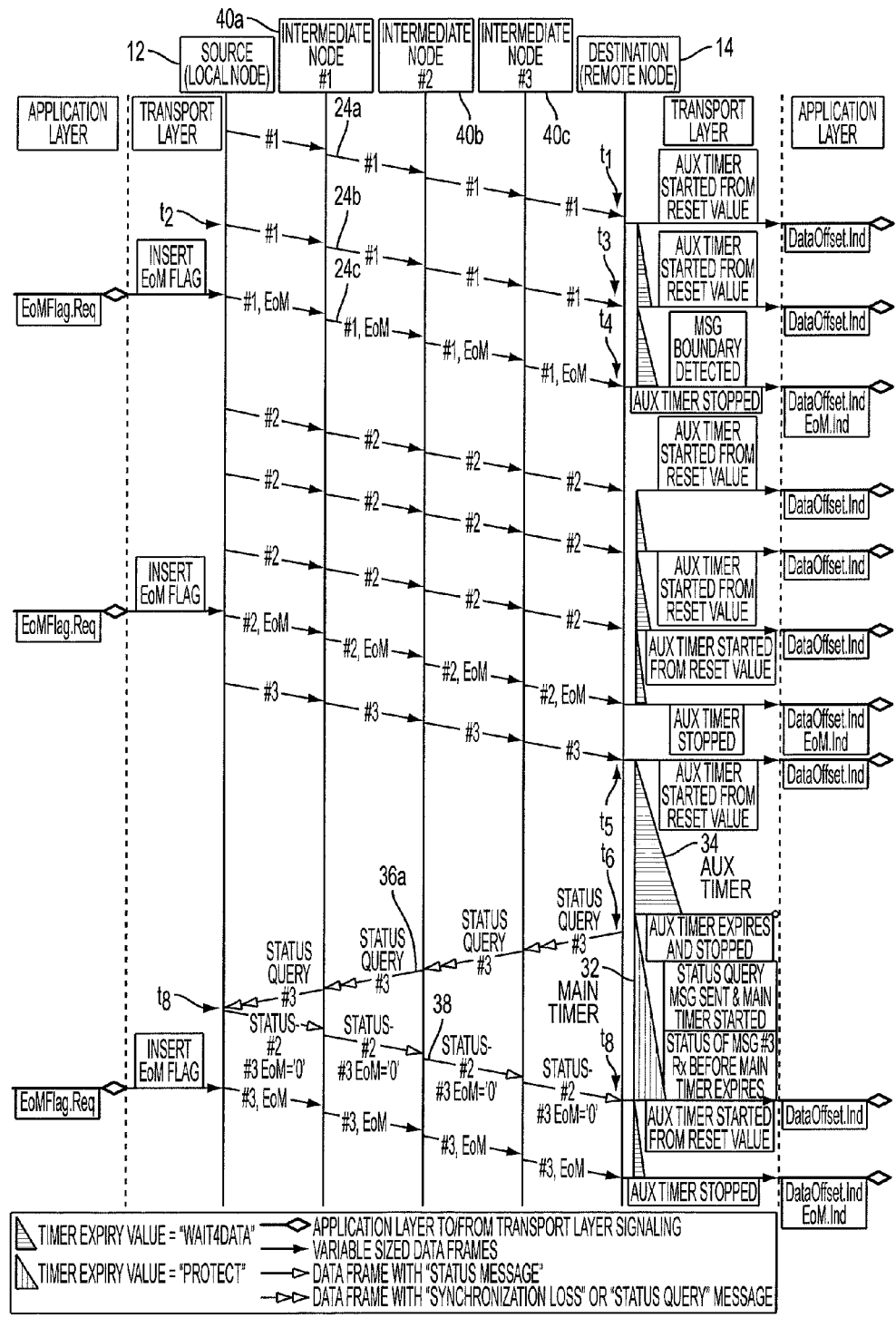
FIG. 7 illustrates functioning of the loss of message boundary detection protocol when there are no errors on any links between source and destination nodes according to exemplary embodiments.

FIG. 7 illustrates the functioning of the message boundary detection protocol when there are no errors on any links according to exemplary embodiments. The depicted system consists of source node 12 sending real-time data to destination node 14 through three intermediate nodes 40*a, b, c*. The message boundary detection protocol works for any number of intermediate nodes 40 including zero intermediate nodes according to exemplary embodiments. The probability of data losses increases with the increasing number of data links (between the nodes) as each of them is prone to errors. Since the message boundary detection protocol belongs to the transport layer, the layers below it are not shown in the message charts for the dual purposes of clarity and brevity. Main and aux. timers 32, 34 are located destination node 14, which is the destination node transport layer. Though not shown explicitly in the message charts, there are state machines, which implement the protocol, at source node 12 and destination node 14. Flow charts pertaining to the functioning of these state machines are discussed in greater detail below. As those of ordinary skill in the art can appreciate, state machines can include computers, processors, ASICs, FPGAs, among other types of devices, and shall be explained in greater detail below.

According to an exemplary embodiment, the application within device 16 is allowed to provide data as arbitrary sized messages to the source node's 12 transport layer which splits the message into manageable sized segments. The segments are Protocol Data Units (PDUs) of the transport layer. The segments are encapsulated with necessary headers and/or trailers to create packets by the network layer. The packets, after encapsulation with Layer-2 headers and/or trailers, are transmitted as data frames 24 by the data link layer using the services of the physical layer in the protocol stack. FIG. 7 does not show the network, data link and physical layers, but the individual data frames 24 that belong to the same message 22 are shown going over the physical data links between nodes 40. Each of those data frames 24 carries the message sequence field 28, which contains the message sequence (msg. seq.) #. For example, the first message that is transmitted from source 12 is split into three data frames 24 and each carries the msg. seq. #1. When the last data of a message 22 is handed over by the application to the transport layer, it indicates this through some signaling. According to exemplary embodiments, the signaling is represented by an EoM flag 30. The transport layer inserts an EoM flag 30 in the data frame 24 that contains the last segment of data in the message 22. In FIG. 7 this is indicated in data frame 24 with "EoM" along with the msg. seq. #1.

The data frames 24 are forwarded by the intermediate nodes 40*a, b, c*, which can be switches or hubs, to the correct destination node 14 through a routing protocol. According to an exemplary embodiment of the general inventive concept, any particular routing protocol can be used. The intermediate nodes 40*a, b, c* do not make any modifications to the fields inserted by the transport layer as these nodes 40*a, b, c* implement only layers from physical layer to the network layer.

Destination node 14, on detecting a data frame 24 belonging to a new message 22, starts aux. timer 34. The expiry value of aux. timer 34 is set such that it covers the worst case delay in receiving a subsequent data frame 24 (following transmission of the previous data frame 24) belonging to the same message 22. According to an exemplary embodiment, the expiry value of aux. timer 34 is set to such a value because data frames 24 could be lost because of errors, and if the data frame 24 that is lost carried the EoM flag 30, then the EoM flag 30 information would also be lost. Aux. timer 34 is reset each time a data frame 24 is received. For example, referring to FIG. 7, at time $t_1$, aux. timer 34 is started when data frame 24*a* is received at destination 14. Aux. timer 34 proceeds to count while data frame 24*b* is transmitted at time $t_2$. Note that there is no fixed relation between times $t_1$, and $t_2$. Aux. timer 34 stops counting when data frame 24*b* is received. Aux. timer 34 did not reach its maximum, count time, the "expiry value," because the delay from time $t_2$ to time $t_3$ was less than the expiry time. Similarly, aux. timer 34 restarts counting when data frame 24*b* is received, and again does not reach its expiry time when data frame 24*c* is received. However, aux. timer 34 stops and is not re-set because data frame 24*c* contains EoM flag 30, as it is the final data frame 24 of message 22. When an EoM flag 30 is received, at time $t_4$, the message boundary detection protocol indicates to the application that message boundary is detected. Aux. timer 34 is then reset and started again on detection of a new message 22 with an incremented message sequence number 28. Each time that data frames 24 are received by the transport layer, the data is passed onto the application layer.

As shown in FIG. 7, messages 1 and 2 are completely and successfully received by destination node 14. At time $t_5$, however, a first data frame 24 is received for message #3 and aux. timer 34 begins to count. But by time $t_6$ occurs, no other data frames 24 have arrived, and therefore aux. timer 34 expires. Once aux. timer 34 expires, destination node 14 sends status query message 36*a* to source node 12. Status query message 36*a* contains the "Last Received Message Sequence Number" and the "Data Offset" values (see FIG. 5) indicating the data reception status at destination node 14. After source node 12 receives status query message 36*a* at time $t_7$ from destination node 14, it sends status report message 38 back to destination node 14. Status report message 38 contains at least the previous message's end offset with corresponding message sequence number and current message's latest data offset. It can also carry EoM flag 30 if the current message has finished. This information is maintained in the state memory of source node 12 and updated with each data transmission. There exists a possibility that the data offset carried by status query message 36*a* for the current message is different from the latest data offset at source node 12 due to the fact source node 12 could have sent more data after the status query message 36*a* was initiated by destination node 14.

Referring again to FIG. 7, and the transmissions between times $t_5$ through $t_8$, it can be seen that handshaking according to exemplary embodiments occurs between destination node 14 and source node 12. Furthermore, it can be seen that status query message 36*a* carries the message number "3" as the current message. The offset value 26 is not shown in status query message 36*a* though it is contained in it. In response, source node 12 sends status report message 38 which is composed of the previous message number as message #2 and its end data offset (the offset is not shown in FIG. 7) and the current message as message #3. EoM flag 30 not set (EoM='0' as message #3 is not finished yet) and its offset (the offset is not shown in FIG. 7; however, see FIG. 6 for an illustration of status report message 38). In the example shown in FIG. 7, the current data offset of message #3 in status report message 38 is same as that in status query message 36*a* as no data transmission occurred after status query message 36*a* was created at destination node 14. According to exemplary embodiments, the data offset value is contiguous and is agnostic of the message boundaries. That is, the data offset value continues to increment regardless of message boundaries, as it is not defined as bytes per message, but bytes sent by the application. As such, it continues to increment, even across message boundaries, until it reaches its terminal value, and then begins again. Moreover, data contained in data frames 24 is accepted while destination node 14 is waiting for response to its status query message 36a. Upon receipt of status report message 38, destination node 14 realizes that it is still in the midst of message #3 (as EoM='0') and it re-starts aux. timer 34. Aux. timer 34 is stopped when the next data frame carrying EoM flag 30 is received. According to exemplary embodiments, the data offset is passed on to the application each time status report message 38 is received by destination node 14. Although main timer 32 is shown in FIG. 7, its effect on operation of the loss of message boundary detection protocol, has not been discussed as no errors were introduced in the scenario shown in FIG. 7

Figure 8:
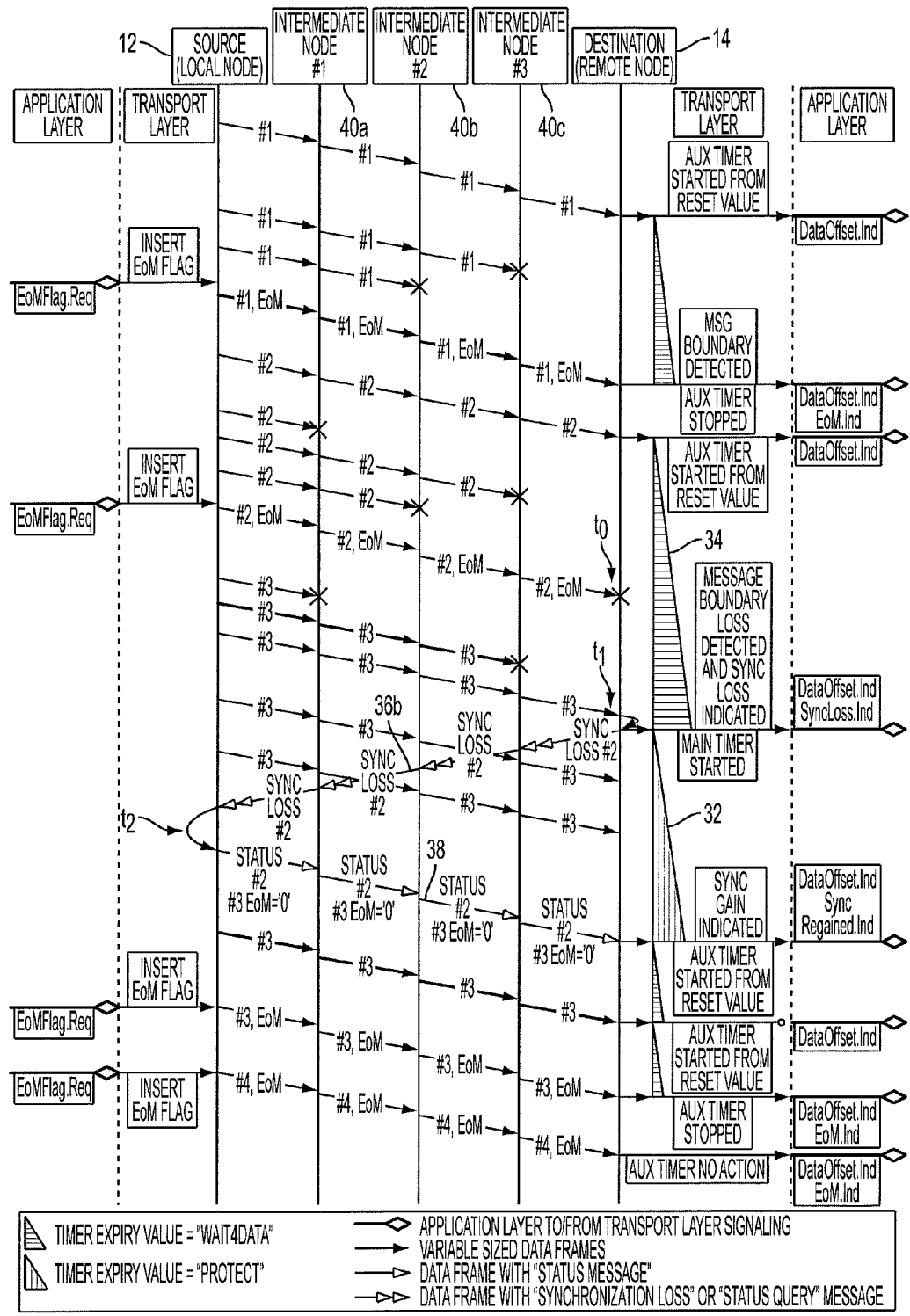
FIG. 8 illustrates functioning of the loss of message boundary detection protocol when there are errors on one or more of the links between source and destination nodes according to exemplary embodiments.

FIG. 8 illustrates functioning of the loss of message boundary detection protocol when there are errors on one or more of the links between source and destination nodes according to exemplary embodiments. These errors can cause data to become lost, and if message boundaries are lost, this would lead to loss of synchronization. If the error corrupts the data within a message but does not affect the message boundaries, then destination node 14 does not send loss of synchronization (sync loss) message 36b to source node 12; this is the scenario that was shown and discussed in reference to FIG. 7, and message #3. As discussed above, aux. timer 34 is started from reset when the first data frame 24 of message #1 is detected. The loss of intermediate data frames, should they occur, is not detected at destination node 14 until the last data frame belonging to a message is received (with EoM flag 30 set, to show the end of message). Since the destination node transport layer passes on the data offset to the application layer whenever data frame 24 or status report message 38 is received, the application can know approximately the amount of data that was lost, by comparing offset values. When data frame 24 with EoM flag 30 set for message #1 is received, the transport layer indicates to the application the message boundary and also the data offset received. Since the message boundary for message #1 was not lost, the application can calculate the amount of data lost from the offset values provided. According to a further exemplary embodiment, lost data, especially in regard to lost video data, can be fairly compensated for through the use of video data interpolation algorithms. Both the use of, and the workings of, video data interpolation algorithms is beyond the scope of this discussion, and is not necessary in order to understand the exemplary embodiments described herein, and as such a detailed discussion thereof has been omitted for purposes of clarity and brevity.

However, if the errors cause the loss of data frame 24 carrying EoM flag 30, then the loss of message boundary is detected from data frame 24 of a new message. This leads to a loss of synchronization and destination node 14 transmits sync loss message 36b to source node 12 with the last correctly received message sequence number and data offset value after starting main timer 32. When source 12 detects sync loss message 36b, it sends status report message 38 similar to one sent when a status query message 36a is received. Source node 12 can also optionally signal the application running on source node 12 that a loss of sync has occurred at destination node 14. Referring now to FIG. 8, message #2 loses data frame 24 carrying EoM flag 30 at time $t_0$ (the "X" in the figure means the message was not properly received), in addition to one or more of intermediate data frames 24 (for message #2). The first data frame 24 of the next message (message #3) is also lost. Destination node 14, on receiving the second data frame 24 of message #3 at time $t_1$ detects a loss of message boundary (i.e., the lack of EoM flag 30 for message #2). Destination node 14 then performs several actions according exemplary embodiments of the general inventive concept. At time $t_1$ destination node 14 transmits sync loss message 36b to source 12 indicating that destination node 14 lost the end of message #2. Source node 12, upon receipt of sync loss message 36b at time $t_2$, sends a current status report message 38 containing the end-of-message data offset for message #2 (because message #2 is the previous message). In an alternative embodiment, message 38 may contain the end-of-message data offsets for the N last transmitted messages, where N is a constant larger than 1. Status report message 38, sent at time $t_2$, indicates the current message as message #3 and provides the offset value 26 of the data transmitted so far. According to exemplary embodiments of the general inventive concept, destination node 14 returns to synchronization because it determines that it has not received the end of message boundary and, using the offset values in status report message 38, determines where the end of the previous message should have been, and then determines from there when the new message should have started, and organizes its data appropriately. Destination node 14 can return to synchronization upon receiving status report message 38 reliably. Upon re-gaining synchronization, aux. timer 34 is started from reset as message #3 transmission is ongoing and destination node 14 needs to monitor the received data messages to take care of the situation in which message #3's message boundary is lost. In case there is no ongoing message, meaning that the current message has an EoM flag 30 set in status report message 38 after re-gaining synchronization, then aux. timer 34 is stopped.

According to a further exemplary embodiment, loss of synchronization can be determined in at least one other manner. A loss of message boundary situation in a previous message can be further determined if a new data frame 24 is received and the difference in message sequence numbers between the new data frame and the previous date frame is at least two or more regardless of whether the last received data frame has its EOM flag set or not, e.g., when an entire message worth of data frames have been lost. In this scenario, destination node 14 will send a sync loss message 36b, and attempt to regain synchronization as discussed above.

Figure 9:
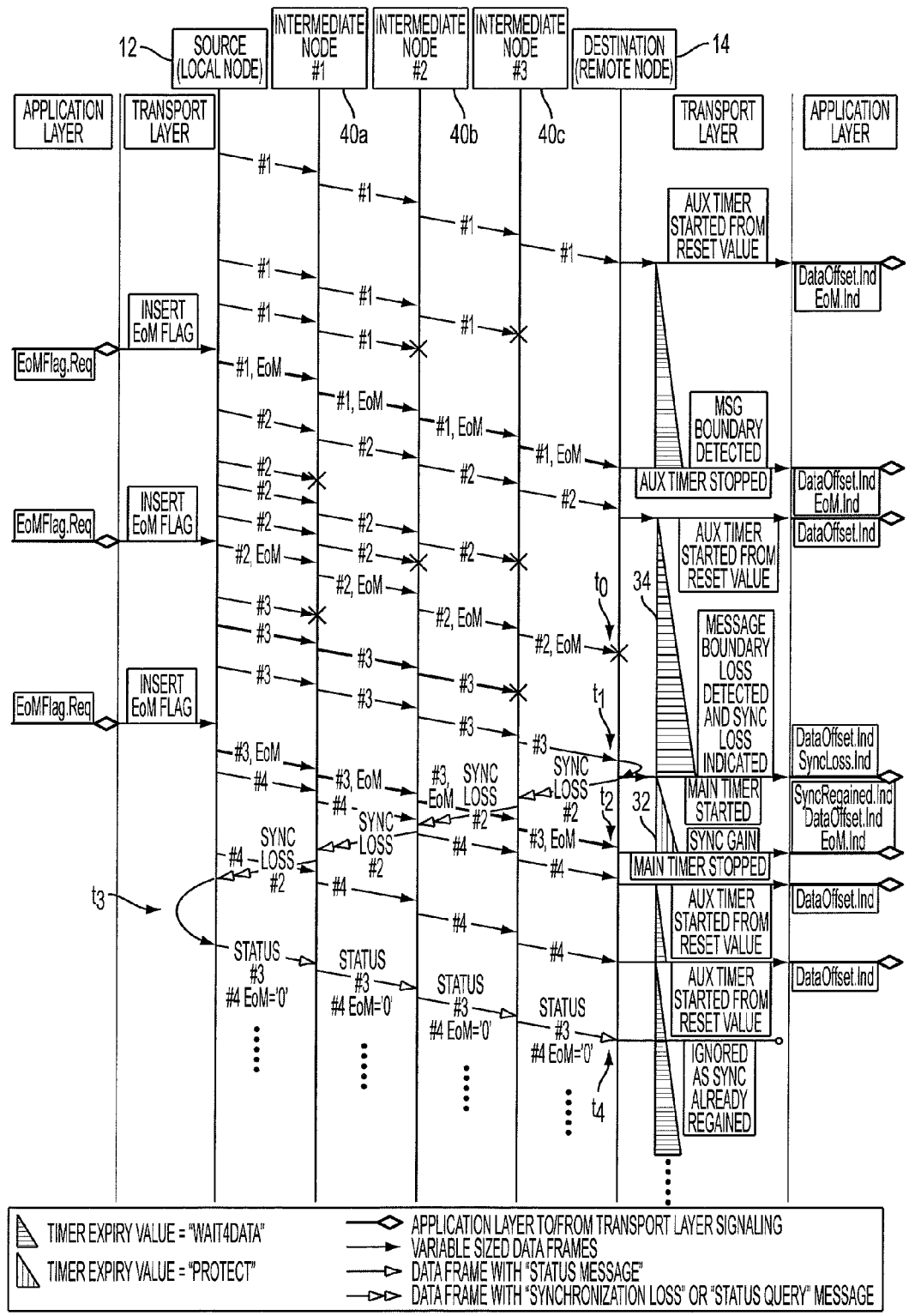
FIG. 9 illustrates functioning of the loss of message boundary detection protocol when there are error on one or more links between source and destination nodes, and when recovery of a message boundary occurs prior to receipt of an expected status report message according to exemplary embodiments.

Attention is directed to FIG. 9. FIG. 9 illustrates functioning of the loss of message boundary detection protocol when there are error on one or more links between source and destination nodes 12, 14, and when recovery of a message boundary occurs prior to receipt of an expected status report message according to exemplary embodiments. At time $t_0$, destination node 14 fails to receive data frame 24 message #2 with EoM flag 30 set, meaning that destination node 14 fails to recognize the message boundary of message #2. As discussed above, when destination node 14 recognizes, at time $t_1$, that it has not received the message boundary indicator, destination node 14 will send sync loss message 36b, which is does. According to further exemplary embodiments, there is the possibility that while destination node 14 is waiting for the response to its sync loss message 36b sent at time $t_1$ (i.e., the expected response being status report message 38), destination node 14 will receive the message boundary of the ongoing message. At time $t_2$, destination node 14 receives, for message #3, data frame 24 with EoM flag 30 set, which is prior to receipt of status report message 38 for message #2 at time $t_4$. Receipt of data frame 24 with EoM flag 30 set allows destination node 14 to re-gain synchronization prior to receipt of status report message 38 that is protected by main timer 32. Once synchronization by destination node 14 is re-gained, destination node 14 stops main timer 32. Aux. timer 34 is re-started when a data frame belonging to the next expected message sequence number is received.

In FIG. 9, data frame 24 carrying EoM flag 30 for message #3 helps the receiver to go into synchronization at time $t_2$. The transport layer indicates that synchronization is regained to the application in addition to indicating the message boundary and data offset. Aux. timer 34 is re-started on the reception of data frame 24 belonging to message #4. Finally, status report message 38 (received at time $t_4$) is ignored as its contents are already known at destination node 14. Optionally, the offset value of the previous message can be passed on to the application to enable calculation of the message size.

Figure 10:
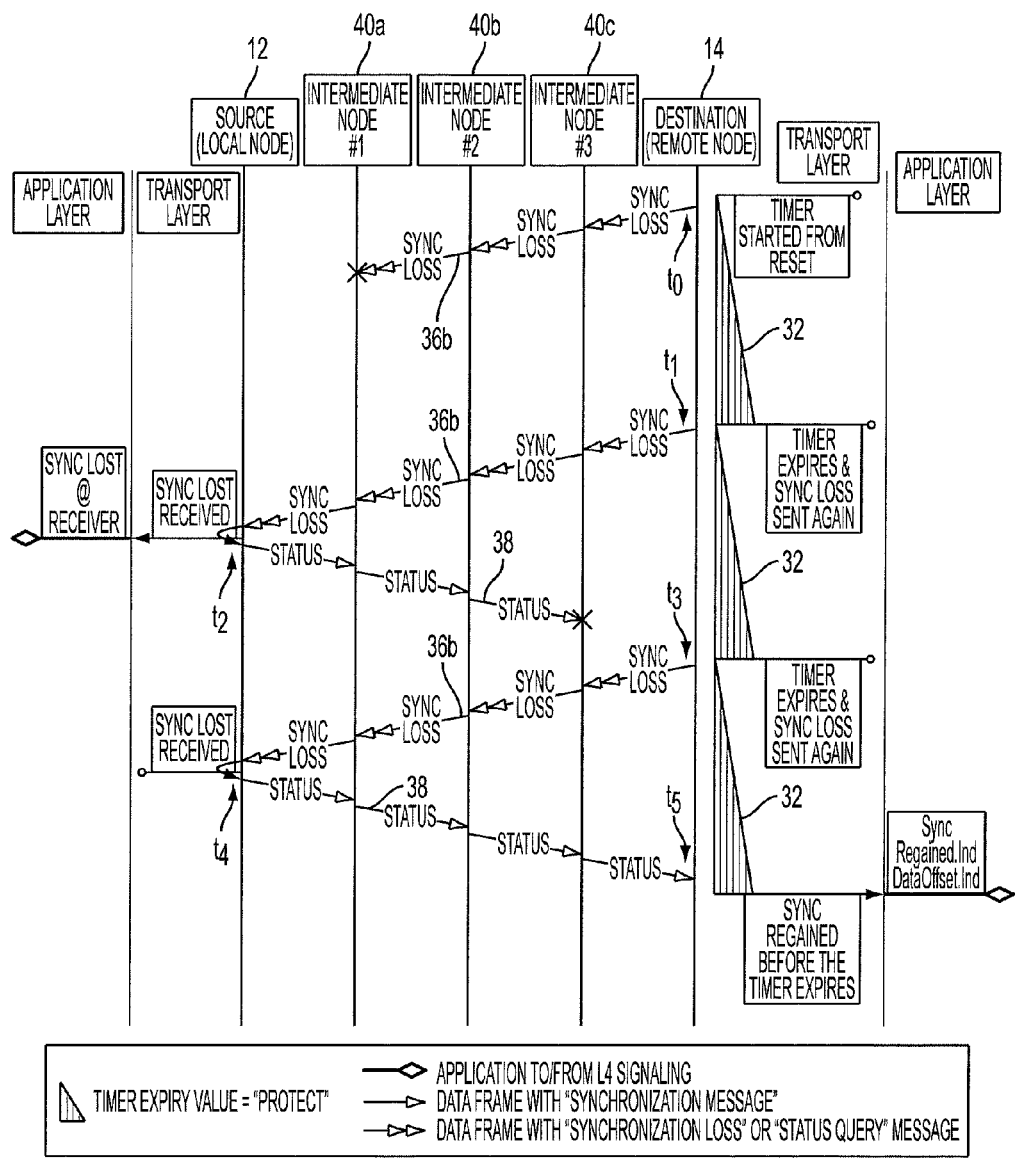
FIG. 10 illustrates functioning of the loss of message boundary detection protocol for protection of sync loss and status messages according to an exemplary embodiment.

FIG. 10 illustrates functioning of the loss of message boundary detection protocol for protection of sync loss and status messages according to an exemplary embodiment. In FIG. 9, it was discussed how main timer 32 provided protection for the situation in which an end-of-message indication was received for a subsequent message, after a sync loss notification was made for a previous message. Main timer 32 also protects the loss of status query message 36a in a similar manner. Main timer 32 is started when either sync lost message 36b or status query message 36a is sent by destination node 14. In FIG. 10, sync loss message 36b is transmitted by source node 12 at time $t_0$, but this sync loss message 36b is lost between intermediate nodes 40b and 40a. Since no status report message 38 is received within the expiry of main timer 32, the first sync loss message 36b is considered lost, and another sync loss message 36b is re-sent at time $t_1$. In a second scenario, after second sync loss message 36b is sent by destination node 14, status report message 38, transmitted by source node 12 at time $t_2$, is not received before main timer 32 expires ($t_3$). Now destination node 14 resends sync loss message 36b at time $t_3$, and main timer 32 is restarted. In this case, however, source node 12 receives sync loss message 36a (at time $t_4$), and source node 12 transmits status report message 38. In summary, according to further exemplary embodiments, a sync lost message or status query message 36a, b are sent until either or both are acknowledged with status report messages 38 and main timer 32 keeps temporal track of this handshaking.

Figure 11:
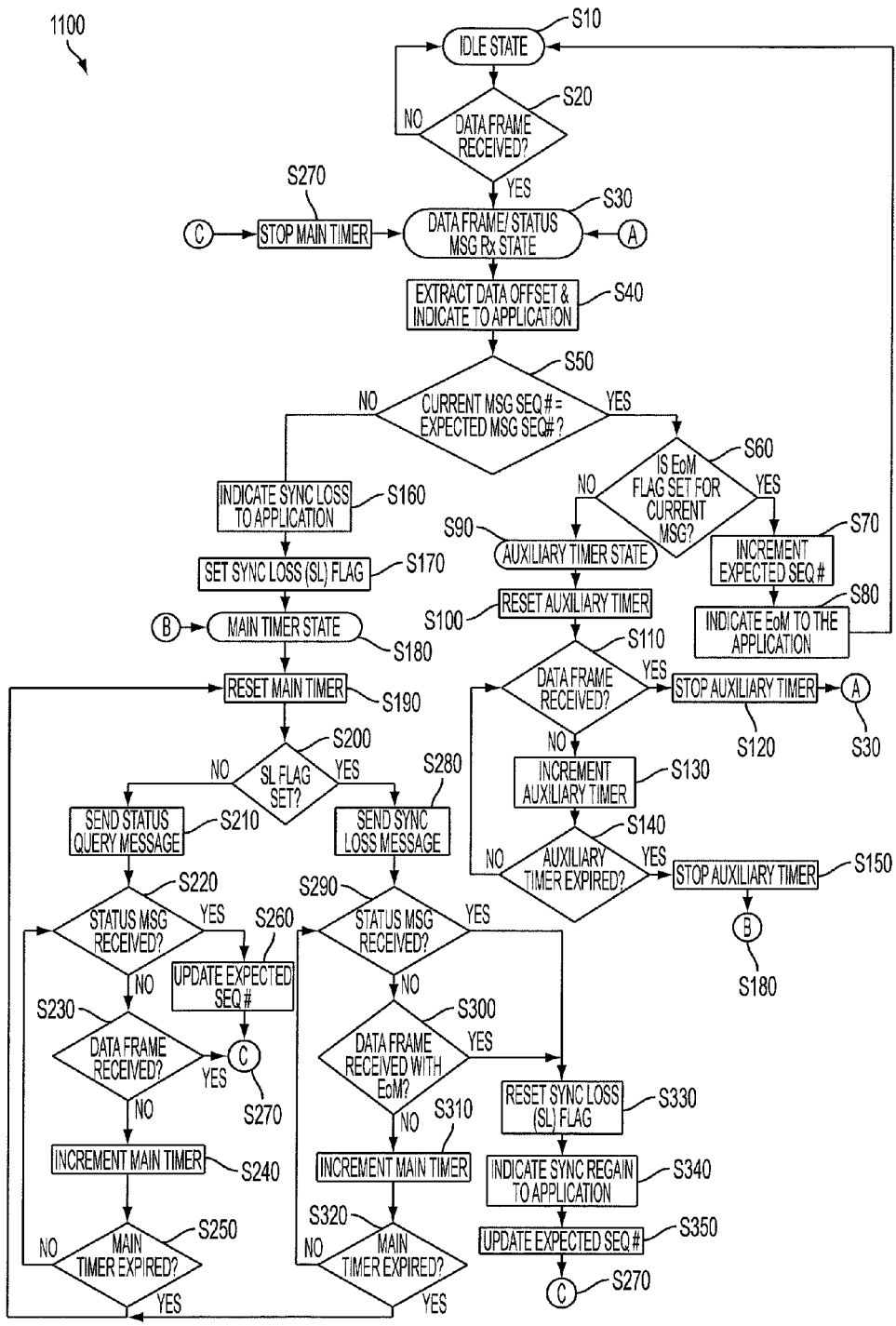
FIG. 11 is a flow chart that illustrates operation of the destination node when embodying the loss of message boundary protocol according to exemplary embodiments.
Figure 12:
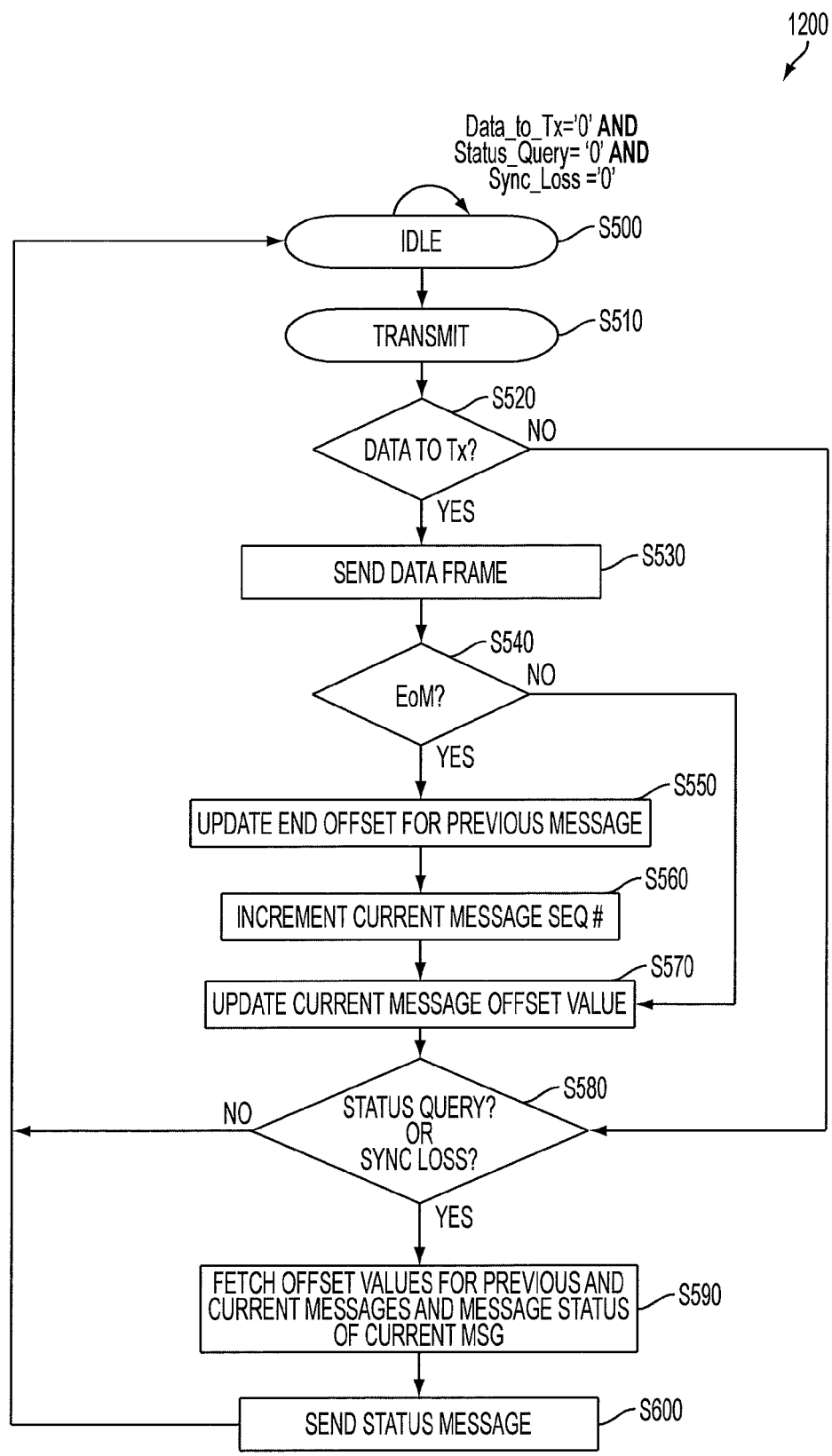
FIG. 12 is a flow chart that illustrates operation of the source node when embodying the loss of message boundary protocol according to exemplary embodiments.

FIGS. 11 and 12 are flow charts that illustrate operation of the destination node 14 and source node 12 when embodying the loss of message boundary protocol according to exemplary embodiments of the general inventive concept. According to further exemplary embodiments, although main timer 32 and aux. timer 34 are shown and discussed as being separate items, their functionality can be combined into a single timer as their functioning is mutually exclusive, meaning the aux. timer 34 and main timer 32 do not operate at the same time.

FIG. 11 depicts a flow chart of method 1100 that controls operation of destination node 14 when embodying the loss of message boundary protocol according to an exemplary embodiment of the general inventive concept. The destination node 14 state machine has four states—(1) idle state, (2) data frame/status message received state, (3) auxiliary timer state and (4) main timer state. As those of skill in the art can appreciate, the particular implementation of the states is a representative embodiment, and different states can be formed to meet the functionality of the loss of message boundary protocol according to further exemplary embodiments. That is, other possible implementations can exist and are within the exemplary embodiments of the general inventive concept.

Destination node 14 is in its idle state (1) at step S10. Typically this is the normal operating state of source and destination node 12, 14 when no transmissions are occurring. Destination node 14 comes out of idle state (step 10) as soon as a first data frame 24 is received, as shown in decision step S20, to enter the data frame/status message state (2) at step S30, at which time destination node 14 processes the information in the received data frame 24. While in the data frame/status message state (2) after extracting and indicating the offset value 26 to the application (S40), a determination is made in decision step S50 to determine whether the received message sequence number 28 is same as the one that is expected. This is done to determine whether a loss of message boundary can be determined from the change in message sequence numbers 28. If the newly obtained message sequence number 28 is not the one that is expected ("No" path from decision step S50), then method 1100 proceeds to indicate sync loss to the application in step S160, sets the sync loss flag in step S170 so that destination node 14 realizes that it has to send sync loss message 36b while destination node 14 is in the main timer state (4) and then enters the main timer state (4) in step S180 to physically send sync loss message 36b. If, however, the current message sequence number is the expected one ("Yes" path from decision step S50), then a check is performed in decision step S60 to determine if data frame 24 carried EoM flag 30 which indicates a message boundary. If EoM flag 30 is received ("Yes" path from decision step S60), then the expected sequence number is incremented (S70) and an end-of-message indication and message size information is given to the application in step S80. Destination node 14 then returns to the idle state (1) in step S10 to wait for additional data frames 24 belonging to a new message. In the case that data frame 24 does not carry an EoM flag 30 ("No" path from decision step S60), then it is possible that additional data frames 24 in the message could be received. Hence, aux. timer 34 has to be started to protect the event that a data frame 24 carrying EoM flag 30 is not lost. Destination node 14 enters the auxiliary timer state (3) in step S90 to protect against the occurrence of a lost EoM flag 30. In the auxiliary timer state (3), aux. timer 34 is reset in step S100. Then, a determination is made to see if any additional data frames 24 have been received in decision step S110. If a data frame 24 is received ("Yes" path from decision step S110), then destination node 14 stops aux. timer 34 in step S120, and returns to the data frame/status message state (2) at step S30. If no data frame 24 is received ("No" path from decision step S110), then aux. timer 34 is incremented (S130) and then a determination is made as to whether aux. timer 34 has reached its expiry value in decision step S140. If aux. timer 34 has not reached its expiry value ("No" path from decision step S140), then destination node 14 returns to check if data frame 24 is received in decision step S110 and method 1100 repeats the steps of determining whether data frame 24 has been received, incrementing aux. timer 34, and determining whether aux. timer 34 has expired. In the case when aux. timer 34 expires ("Yes" path from decision step S140), then no data frame 24 has been received in the expected inter-data frame 24 time interval and status query message 38 has to be sent to source node 12. Destination node 14 stops aux. timer 34 (S150) and enters the main timer state (4) in step S180 to send status query message 36a. Method 1100 then proceeds to step S180.

After entering the main timer state (4) in step S180, destination node 14 first resets main timer 32 in step S190, then a determination is made as to whether destination node 14 has entered main timer state (4) to protect against a loss of either sync loss message 36b or status query message 36a (the situation that has been discussed above in regard to FIG. 10). Destination node 14, in method 1100, determines whether and what type of message has been lost by looking at the status of sync loss (SL) flag in decision step S200. In the case that destination node 14 entered the main timer state (4) for recovery or protection against a loss of status query message 36a ("No" path from decision step S200, i.e., sync loss message 36b has not been lost), the SL flag will be reset and destination node 14 sends status query message 36a in step S210. Then, destination node 14 looks for reception of status report message 38 from source node 12 in step S220. If status report message 38 has not been received ("No" path from decision step S220), then destination node 14 determines whether a data frame 24 has been received in decision step S230. If a data frame 24 has been received, then destination node 14 leaves the main timer state (4), stops main timer 32 in step S270, and goes back to data frame/status Msg. Rx state (2). Also, if status report message 38 has been received ("Yes" path from decision step S220), then destination node 14 leaves the main timer state (4), stops main timer 32 in step S270, and goes back to data frame/status Msg. Rx state (2) where further processing is performed as described earlier. Prior to leaving main timer state (4) following decision step S220, when status report message 38 has been received, method 1100 updates the expected message sequence number to the current message sequence number contained in status report message 38 in step S260. In the situation in which both status report message 38 has not been received, and data frame 24 also has not been received, ("No" paths from both decision steps S220 and S230), then main timer 32 is incremented (S240) and in decision step S250 a determination is made as to whether or not main timer 32 has expired. If main timer 32 has not expired ("No" path from decision step s250), then method 1100 returns to decision step S220. If main timer expires 32 without satisfying either of the conditions determined in decision steps S220 and S230, then main timer 32 is again reset in step S190, and decision step 200 is repeated to check the status of the SL flag.

Returning to decision S50, it is possible that the data frame 24 that is received has a message sequence # that is different from the expected message sequence # ("No" path from decision step S50). If that is the case, then a synchronization loss occurs and destination node 14 needs to send sync loss message 36b to source node 12. Destination node 14 indicates sync loss to the application at destination node 14 in step S160, and sets the sync loss (SL) flag in step S170, and enters the main timer state (4) in step S180. In step S190, main timer 32 is reset, and then a check is made to verify that the SL flag is set in decision step S200. As discussed above, a determination needs to be made as to whether method 1100 and destination node 14 needs to protect against a loss of status query message 36a or sync loss message 36b. In this case, since it is sync loss message 36b that has been lost (see, decision from decision step S50), the SL flag is found to be set. Therefore, destination node 14 sends sync loss message 36a to source node 12 in step S280. After step S280, destination node 14 verifies whether a status report message 38 has been received in decision step S290. If no status report message 38 was received, then destination node 14 looks for a data frame with EoM flag set (S300), which is other alternative to get into synchronization. If no such data frames 24 have been received, then main timer 32 is incremented (S310) and a check is done to determine if main timer 32 has expired (S320). If main timer 32 has expired ("Yes" path from decision step S320), then main timer 32 is reset (S190) and destination node proceeds to again check to determine if the sync loss (SL) flag is set. If main timer 32 has not expired ("No" path from decision step S320), then destination node 14 and method 1100 return to decision step S290 to determine whether status report message 38 has been received. If not, then destination node 14 attempts to get back into synchronization by determining whether or not a data frame 24 has been received in decision step S300. If either one of the possibilities to get back in synchronization occurs (i.e., if a status report message 38 or a data frame 24 with an EoM flag 30 has been received), then destination node 14 resets the SL flag (S330) and indicates the synchronization regained to the receive application (S340). Then destination node 14 updates the expected message sequence number to the current message sequence number carried in the status report message 38 or the data frame 24 before stopping main timer 32 in step S270 and going to the data frame/status message state (2) in step S30.

FIG. 12 is a flow chart that illustrates operation of source node 12 when embodying the loss of message boundary protocol according to exemplary embodiments. Source node 12 remains in idle state (S500), unless a transmission needs to be made, or a message is received. In the first case, a transmission can be data or status report message 38; however, status report messages 38 generally occur after the transmission of data has already been initiated, and therefore source node 12 is already in transmit state when it transmits status report message 38. In the second case, received messages can include either of status query message 36a or sync loss message 36b. If there is data or status report message 38 to transmit, then source node 12 enters the transmit state (S510). In the transmit state, source node 12 first determines what caused it to enter the transmit state: it does this by determining whether there is data to transmit in decision step S520. Source node 12 does this so that is can include the latest information in status report message 38 sent in response to either of status query message 36a or sync loss message 36b. If there is data to transmit ("Yes" path from decision step S520), then after transmitting data frame 24 in step S530, a determination is made as to whether the application set EoM flag 30 with this data in decision step S540. If data frame 24 includes EoM flag 30 ("Yes" path from decision step S540), then the end-data offset is calculated and stored as the offset value of the previous message (S550), and message sequence number 28 is incremented (S560). In step S570, method 1200 sets the initial value of the current message offset to the same value as was updated in step s550. The message offset value will be updated later on when additional data is transmitted for other new messages.

If, however, there is no EoM 30 indication ("No" path from decision step S540), then source node 12 updates the data offset value for the current message in step S570. Source node 12 then determines whether status query message 36a or "sync loss message 36b has been received in decision step S580, as it is possible that either of them could have been received from destination node 14 simultaneously with the data to transmit request from the application. This check is also done if the test for data to transmit fails ("No" path from decision step S520). If there is no status query message 36a or sync loss message 36b to be sent ("No" path from decision step S580), then source node 12 returns to idle state (S500). Otherwise, if there is either of status query message 36a or sync loss message 36b to be transmitted ("Yes" path from decision step S580) source node 12 obtains the offsets of the previous message and the current message from memory (S590) and includes them in status report message 38 that is sent in step S600 along the corresponding message sequence numbers and the message status (EoM flag 30) of the current message. Once status report message 38 is sent, source node 12 returns to the idle state and waits for new data or a request to send another status report message 38.

According to exemplary embodiments, the loss of message boundary detection protocol discussed in detail herein provides a system and method of transmitting real-time data as multiple messages over an interconnect where each message represents a unit of data that can be processed as one entity and hence boundaries of each message can act as synchronization points at destination node 14. Each message 22 can be transmitted as one or more sub-units called segments (data units of Layer-4) which are encapsulated as data frames (data units of Layer-2) 24. Data frame(s) 24 belonging to message 22 are identified by a message sequence number.

According to further exemplary embodiments, each message boundary is identified by an End of Message (EoM) flag 30 carried in the last data frame 24 belonging to a particular message 22. Loss of message boundaries is detected at destination node 14 when there is a change in message sequence number 28 between messages without receiving an EoM flag 30 for the previous message. Loss of message boundaries is communicated to source node 12 through sync loss messages 36a sent by source node 12. Source node 12 sends status report messages 38 in response to sync loss message 36a to enable destination node 14 to get back in synchronization. According to further exemplary embodiments, sync loss messages 36a and status query messages 36b sent by destination node 14 are protected by one or more timers (main timer 32 and aux. timer 34) at destination node 14 from being lost.

According to exemplary embodiments, the system and method disclosed herein protects the loss of message boundary of a message transmission that has been detected at destination node through aux. timer 34. Aux. timer 34 is started at the reception of data frame 24 belonging to a message 22 without EoM flag 30 set. Aux. timer 34 is re-started when subsequent data frames 24 belonging to the same message 22 are received without EoM flag 30 set. Aux. timer 34 is stopped when data frame 24 belonging to the same message 22 with the EoM flag 30 set is received.

According to further exemplary embodiments, aux. timer 34 eventually expires if no further data frames 24 belonging to the same message 22 that triggered aux. timer 34 are received. Destination node 34 indicates such a scenario to source node 12 by sending status query message 36a. In response, source node 12 sends status report message 38 to notify destination node 14 about the status of the message transmission.

Status query message 36a and status report messages 38 are protected by main timer 32 which also protects sync loss message 36b. According to further exemplary embodiments, the expiry value of aux. timer 34 is negotiated at the beginning of the data transfer between source node 12 and destination node 14.

For each of the methods described above, corresponding devices (e.g., interconnects or interfaces), systems and software that operate in accordance with the methods/protocols described above are also included in the various exemplary embodiments of the general inventive concept.

According to an exemplary embodiment, implementation of methods 1100 and 1200, as shown in regards to FIGS. 11 and 12 can occur in a dedicated processor (not shown in either of FIG. 4 or 5), or through the various functional blocks shown in FIGS. 1 and 2 such as source node 12 and destination node 14. Those of ordinary skill in the art of the general inventive concept can appreciate that such functionality can be designed into various types of circuitry, including, but not limited to field programmable gate array structures (FGPAs), application specific integrated circuitry (ASICs), microprocessor based systems, among other types. A detailed discussion of the various types of physical implementations does not substantively aid in an understanding of the general inventive concepts, and as such has been omitted for the dual purposes of brevity and clarity. However, as well known to those of ordinary skill in the art, the systems and methods discussed herein can be implemented as discussed, and can further include programmable devices.

Considering first, second and third messages which are to be received over an interconnect, and from the foregoing discussion, it will be appreciated that loss of message boundary according to some embodiments can involve, for example, detecting either (a) that at least one data frame belonging to the first message has been received, and a data frame belonging to the second message different from the first message has been received before a data frame having its end-of-message flag set and belonging to the first message has been received, i.e., from which the loss of the first message boundary can be inferred, or (b) that a data frame belonging to a third message having a sequence number which is at least two greater than a sequence number associated with the first message has been received after the data frame having its end-of-message flag set and belonging to the first message has been received, and no data frame belonging to the second message having a sequence number higher than the sequence number of the first message and lower than the sequence number of the third message has been received, i.e., from which the loss of the second message boundary can be inferred. These two loss of message boundary tests (a) and (b) can be used together or independently of one another.

As mentioned above, when a loss of message boundary is detected, a loss of synchronization message (loss of message boundary message) can be transmitted by the destination node, in response to which the destination node can receive a synchronization status report from which synchronization can be re-established. A purely illustrative example is provided below.

Notation: "←" means received frame, "→" transmitted frame
    ← DataFrame(MSG#1,EoM=0,offset=1A)
    ← DataFrame(MSG#1,EoM=1,offset=1B)
    ← DataFrame(MSG#2,EoM=0,offset=2A)
        X DataFrame(MSG#2,EoM=1,offset=2B)  // lost
        X DataFrame(MSG#3,EoM=1,offset=3A)  // lost
        X DataFrame(MSG#4,EoM=0,offset=4A)  // lost
        X DataFrame(MSG#4,EoM=1,offset=4B)  // lost
        X DataFrame(MSG#5,EoM=0,offset=5A)  // lost
        ← DataFrame(MSG#5,EoM=0,offset=5B)  // End of
    MSG#2, MSG#3, MSG#4, and (optionally)
    the start of MSG#5 were lost
    → SyncLoss(MSG#5,offset=5A)
A simple status report indicates the previous message EoM position and the current message status:
    ← Status (MSG#4, offset=4B,
        EoM=0,MSG#5, offset=5A)
A complex status report indicates the last N previous messages EoM position and the current message status. For N = 4:
    ← Status (MSG#1, offset=1B,
        MSG#2, offset=2B,
        MSG#3, offset=3A,
        MSG#4, offset=4B,
        EoM=0,MSG#5, offset=5A)

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

The invention claimed is:

1. A method performed by a destination node for handling a loss of message boundary in a real-time data transmission over an interconnect, the method comprising:
   receiving over the interconnect a plurality of messages, wherein each message includes one or more data frames, and each data frame of each message includes an end-of-message flag and a message sequence number, and the end-of-message flag is set when the data frame is the last data frame in a particular message, and the message sequence number is different for different messages; and
   determining the loss of message boundary for one of a first message and a second message to be received over the interconnect by detecting that either:
   (a) at least one data frame belonging to the first message has been received, and a data frame belonging to the second message different from the first message has been received before a data frame having its end-of-message flag set and belonging to the first message has been received, or
   (b) a data frame belonging to a third message having a sequence number which is at least two greater than a sequence number associated with the first message has been received after the data frame having its end-of-message flag set and belonging to the first message has been received, and no data frame belonging to the second message having a sequence number higher than the sequence number of the first message and lower than the sequence number of the third message has been received.

2. The method according to claim 1, further comprising:
   transmitting by the destination node a synchronization loss message in response to the loss of message boundary having been determined;
   receiving by the destination node a status report message in response to transmitting the synchronization loss message; and
   synchronizing received message data such that at least one previous message boundary can be determined according to the status report message.

3. The method according to claim 2, wherein:
   the status report message includes an end of message flag for at least a current message that can be set when a current message has been completely sent, and wherein
   the status report includes at least one previous message sequence number as well as the current message sequence number, and the at least one previous message number can refer to either a particular previous message or a set of previous messages, and wherein
   the status report message further includes at least one previous message offset value that corresponds to at least one of a total number of bytes transmitted in the previous message and a total number of bytes transmitted in a previous set of messages, and wherein the status report message further includes a current message offset value that corresponds to a total number of bytes transmitted in the current message.

4. The method according to claim 2, further comprising:
starting a main timer with a first expiry period upon transmittal of the synchronization loss message; and
re-transmitting the synchronization loss message by the destination node upon expiration of the main timer.

5. The method according to claim 4, further comprising:
determining the first expiry period prior to receipt of a first message by the destination node.

6. The method according to claim 5, wherein the step of determining comprises:
measuring a round trip transmission time between the destination node and the source node and including a processing time at the source node.

7. The method according to claim 1, further comprising:
starting an auxiliary timer with a second expiry period upon receipt of each data frame in which the end-of-message flag is not set; and
transmitting by the destination node a status query message upon expiration of the second expiry period of the auxiliary timer, wherein the status query message includes a current message sequence number, and current message offset value that corresponds to a total number of bytes received by the destination node for the current message.

8. The method according to claim 7, further comprising:
determining the second expiry period prior receipt of a first message by the destination node.

9. The method according to claim 7, further comprising:
receiving by the destination node a status report message in response to the status query message, wherein the status report message includes a previous message offset value that corresponds to a total number of bytes transmitted in the previous message, a current message offset value that corresponds to a total number of bytes transmitted in the current message, and a set end-of-message flag if the current message has been completely transmitted; and
determining that if an end-of-message flag is not set, then the current message has not been completely sent and that additional data frames for the current message are expected, and further determining that if the end-of-message flag has been set that the current message is complete and determining the message boundary from the current message offset value received in the status report message.

10. The method according to claim 9, further comprising:
determining that if the current message has not been completed that data frames from the current message have been lost from a comparison of the current offset value in the status report message and the current offset value transmitted by the destination node in the status query report; and
interpolating the missing data from previous data according to an algorithm.

11. The method according to claim 10, wherein the interpolation algorithm pertains to a video data interpolation algorithm for compensating for lost video data frames.

12. The method according to claim 7, further comprising:
starting a main timer upon transmission of the status query message with a second expiry value; and
re-transmitting the status query message by the destination node upon expiration of the main timer.

13. The method according to claim 1, further comprising:
transmitting by the destination node a synchronization loss message upon determination of the loss of message boundary;

receiving by the destination node a new data frame for a new message prior to receiving a response to the transmitted synchronization loss message, wherein the new data frame includes a set end-of-message flag; and
synchronizing previously received message data such that a previous message boundary can be determined according to the new data frame.

14. An apparatus for handling a loss of message boundary in a real-time data transmission, the apparatus comprising:
a destination node transceiver configured to receive messages over an interconnect, wherein each message includes one or more data frames, and each data frame of each message includes an end-of-message flag and a message sequence number, the end-of-message flag being set when the data frame is the last data frame in a particular message, and the message sequence number is different for different messages; and
a destination node processor configured to determine the loss of message boundary for one of a first message and a second message to be received over the interconnect by detecting that either:
(a) at least one data frame belonging to the first message has been received, and a data frame belonging to the second message different from the first message has been received before a data frame having its end-of-message flag set and belonging to the first message has been received, or
(b) a data frame belonging to a third message having a sequence number which is at least two greater than a sequence number associated with the first message has been received after the data frame having its end-of-message flag set and belonging to the first message has been received, and no data frame belonging to the second message having a sequence number higher than the sequence number of the first message and lower than the sequence number of the third message has been received.

15. The apparatus according to claim 14, wherein:
the destination node transceiver is configured to transmit a synchronization loss message upon determination of the loss of message boundary, and wherein
the destination node transceiver is further configured to receive a status report message in response to the transmitted synchronization loss message, and further wherein
the destination node processor is further configured to synchronize previously received message data such that a previous message boundary can be determined according to the status report message.

16. The apparatus according to claim 15, where the status report message includes:
an end of message flag for at least a current message that can be set when a current message has been completely sent, and wherein
the status report includes at least one previous message sequence number as well as the current message sequence number, and the at least one previous message number can refer to either a particular previous message or a set of previous messages, and wherein
the status report message further includes at least one previous message offset value that corresponds to at least one of a total number of bytes transmitted in the previous message and a total number of bytes transmitted in a previous set of messages, and
wherein the status report message further includes a current message offset value that corresponds to a total number of bytes transmitted in the current message.

17. The apparatus according to claim 15, further comprising:
a main timer with a first expiry period configured to begin counting upon transmittal of the synchronization loss message, and wherein:
the destination transceiver is further configured to re-transmit the synchronization loss message upon expiration of the main timer.

18. The apparatus according to claim 17, wherein:
the first expiry period is determined prior to receipt of a first message by the destination node.

19. The apparatus according to claim 18, wherein the first expiry period comprises measurement of a round trip transmission time between the destination node and a source node and includes a processing time at the source node.

20. The apparatus according to claim 14, further comprising:
an auxiliary timer with a second expiry period configured to begin counting upon receipt of each data frame in which the end-of-message flag is not set, and wherein:
the destination node transceiver is configured to transmit a status query message upon expiration of the second expiry period of the auxiliary timer, wherein the status query message includes a current message sequence number, and current message offset value that corresponds to a total number of bytes received by the destination node for the current message.

21. The apparatus according to claim 20, further wherein the second expiry period is determined prior to receipt of a first message by the destination node.

22. The apparatus according to claim 20, wherein
the destination node transceiver is configured to receive a status report message, wherein the status report message includes the previous message offset value that corresponds to a total number of bytes transmitted in the previous message, a current message offset value that corresponds to a total number of bytes transmitted in the current message, and a set end-of-message flag if the current message has been completely transmitted, and further wherein
the destination node processor is configured to determine that if an end-of-message flag is not set, then the current message has not been completely sent and that additional data frames for the current message are expected, and the destination node processor is further configured to determine that if the end-of-message flag has been set that the current message is complete and can further determine the message boundary from the current message offset value received in the status report message.

23. The apparatus according to claim 22, wherein:
the destination node processor is further configured to determine that if the current message has not been completed that data frames from the current message have been lost from a comparison of the current offset value received by the destination node in the status report message and the current offset value transmitted by the destination node, and further wherein the destination node is further configured to interpolate the missing data from previous data according to an algorithm.

24. The apparatus according to claim 23, wherein the interpolation algorithm comprises a video data interpolation algorithm.

25. The apparatus according to claim 20, further comprising:
a main timer with a second expiry value configured to begin counting down upon transmission of the status query message, and wherein
the destination node transceiver is configured to re-transmit the status query message upon expiration of the second timer.

26. The apparatus according to claim 14, wherein:
the destination node transceiver is further configured to transmit a synchronization loss message upon determination of the loss of message boundary, and
the destination node is further configured to receive a new data frame for a new message prior to receiving a response to the transmitted synchronization loss message, wherein the new data frame includes a set end-of-message flag, a status report message, and wherein:
the destination node processor is configured to synchronize previously received message data such that a previous message boundary can be determined according to the new data frame.

27. The apparatus according to claim 14, wherein the apparatus is a cellular telephone.

28. A non-transitory computer readable medium storing instructions which, when executed by a node make the node perform a method for correcting for a loss of message boundary in a real-time data transmission over an interconnect, the instructions comprising:
a first set of instructions making the node to receive, over the interconnect, one or more messages, wherein
each message includes one or more data frames, and each data frame of each message includes an end-of-message flag and a message sequence number, the end-of-message flag being set when the data frame is the last data frame in a particular message, and the message sequence number is different for different messages; and
a second set of instructions making the node to determine the loss of message boundary for one of a first message and a second message to be received over the interconnect by detecting that either:
(a) at least one data frame belonging to the first message has been received, and a data frame belonging to the second message different from the first message has been received before a data frame having its end-of-message flag set and belonging to the first message has been received, or
(b) a data frame belonging to a third message having a sequence number which is at least two greater than a sequence number associated with the first message has been received after the data frame having its end-of-message flag set and belonging to the first message has been received, and no data frame belonging to the second message having a sequence number higher than the sequence number of the first message and lower than the sequence number of the third message has been received;
a third set of instructions making the node to transmit by the destination node a synchronization loss message;
a fourth set of instructions making the node to receive a status report message by the destination node in response to the synchronization loss message; and
a fifth set of instructions making the node to synchronize received message data such that a previous message boundary can be determined according to the status report message.

* * * * *